United States Patent
Challener et al.

(10) Patent No.: US 9,323,956 B2
(45) Date of Patent: Apr. 26, 2016

(54) MERGING EXTERNAL NVRAM WITH FULL DISK ENCRYPTION

(75) Inventors: David C. Challener, Raleigh, NC (US); Daryl Cromer, Cary, NC (US); Howard Locker, Cary, NC (US); Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2058 days.

(21) Appl. No.: 11/865,049

(22) Filed: Sep. 30, 2007

(65) Prior Publication Data

US 2009/0089590 A1    Apr. 2, 2009

(51) Int. Cl.
*G06F 12/14*    (2006.01)
*G06F 21/80*    (2013.01)
*G06F 21/79*    (2013.01)

(52) U.S. Cl.
CPC ............... *G06F 21/80* (2013.01); *G06F 21/79* (2013.01)

(58) Field of Classification Search
CPC .......... G06F 21/78; G06F 21/79; G06F 21/80
USPC ........................................................ 713/193
See application file for complete search history.

(56) References Cited

U.S. PATENT DOCUMENTS

| | | | |
|---|---|---|---|
| 2004/0054914 A1 | 3/2004 | Sullivan | |
| 2007/0014403 A1 | 1/2007 | Loo et al. | |
| 2008/0072071 A1* | 3/2008 | Forehand et al. | 713/193 |
| 2008/0077807 A1* | 3/2008 | Hicks | 713/193 |
| 2008/0080022 A1* | 4/2008 | Gogulapati | 358/487 |
| 2008/0294914 A1* | 11/2008 | Lee et al. | 713/193 |
| 2009/0076849 A1* | 3/2009 | Diller | 705/3 |
| 2009/0313416 A1* | 12/2009 | Nation | 711/100 |

FOREIGN PATENT DOCUMENTS

| | | |
|---|---|---|
| TW | 526431 B | 4/2003 |
| TW | 1229294 B | 3/2005 |

* cited by examiner

*Primary Examiner* — Tamara T Kyle
(74) *Attorney, Agent, or Firm* — Ference & Associates LLC

(57) ABSTRACT

Methods and arrangements for managing a flash drive, hard disk, or connection between the two, in a manner to ensure that sensitive data is not decrypted at any time when it would be vulnerable. Accordingly, in a first implementation, the data may preferably be encrypted as it first goes into a flash drive and decrypted when it comes out of the flash drive. In another implementation, the flash drive may be logically bound to the hard disk, so that they would both use the same encryption key. In yet another implementation, if a hard disk is moved to another system, then the flash drive may also preferably be simultaneously moved.

20 Claims, 3 Drawing Sheets

MERGING EXTERNAL NVRAM WITH FULL DISK ENCRYPTION

FIELD OF THE INVENTION

The present invention relates generally to Full Disk Encryption Drives (FDEs) and to methods and arrangements for managing the same.

BACKGROUND OF THE INVENTION

As known, Full Disk Encryption Drives (FDEs) encrypt all data that comes into them and, once the data is authorized, decrypts all data that goes out. This "blanket" encryption process helps reassure users that everything will be encrypted. As can be expected, however, such a comprehensive process can slow down, a system considerably, meaning that measures have conventionally been sought to speed the process up.

In one solution, external flash memory (or NVRAM, non-volatile random access memory) is used to provide a non-volatile cache for the hard disk (the terms "hard disk" and "hard drive" should be understood to be interchangeable herein), thus helping promote system speed (since a flash memory will not be tied up with "seek time"). However, in this context, it is possible that critical files may be cached without being written to the hard drive, thereby opening up a vulnerable attack point against such files if the machine is stolen, since an unencrypted file may well reside inside the flash.

Accordingly, a compelling need has been recognized in connection with providing full disk encryption in a manner that ensures reasonable system speed while maintaining at the same time a reasonable level of system security.

SUMMARY OF THE INVENTION

In accordance with at least one presently preferred embodiment of the present invention, there are broadly contemplated herein methods and arrangements for managing a flash drive, hard disk, or connection between the two, in a manner to ensure that sensitive data is not decrypted at any time when it would be vulnerable. Accordingly, in a first implementation, the data may preferably be encrypted as it first goes into a flash drive and decrypted when it comes out of the flash drive. In another implementation, the flash drive may be logically bound to the hard disk, so that they would both use the same encryption key. In yet another implementation, if a hard disk is moved to another system, then the flash drive may also preferably be simultaneously moved.

In summary, one aspect of the invention provides a system comprising: a main memory; a full disk encryption hard drive; a non-volatile cache memory which stores data not stored on the hard drive; an encryption module which encrypts data for the non-volatile cache memory.

Another aspect of the invention provides a method comprising: providing a full disk encryption hard drive; storing in a non-volatile cache memory data which is not stored on the hard drive; and encrypting data for the non-volatile cache memory.

Furthermore, an additional aspect of the invention provides a program storage device readable by machine, tangibly embodying a program of instructions executable by the machine to perform a method comprising the steps of: providing a full disk encryption hard drive; storing in a non-volatile cache memory data which is not stored on the hard drive; and encrypting data for the non-volatile cache memory.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
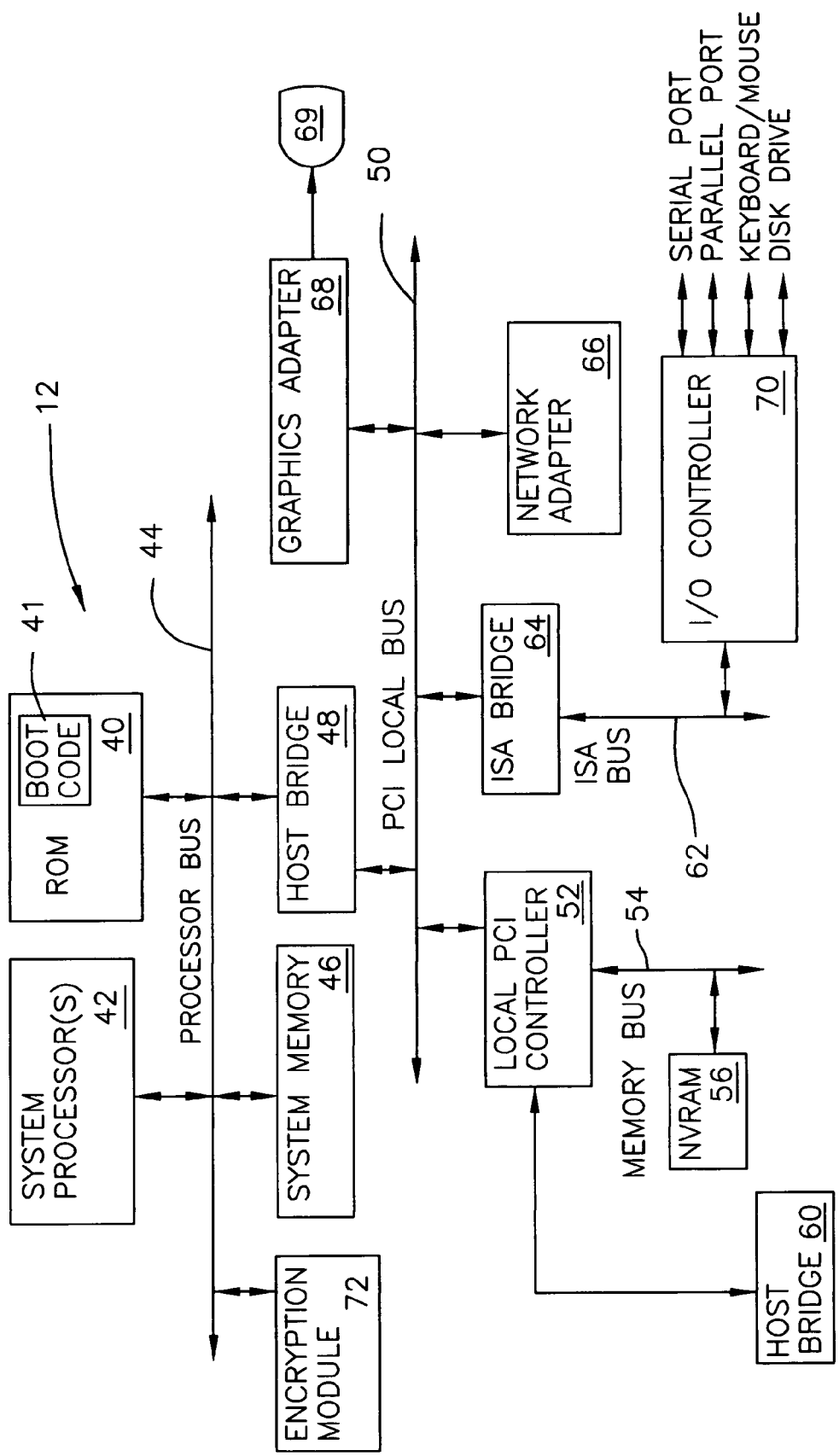
FIG. 1 schematically illustrates a computer system.
Figure 2:
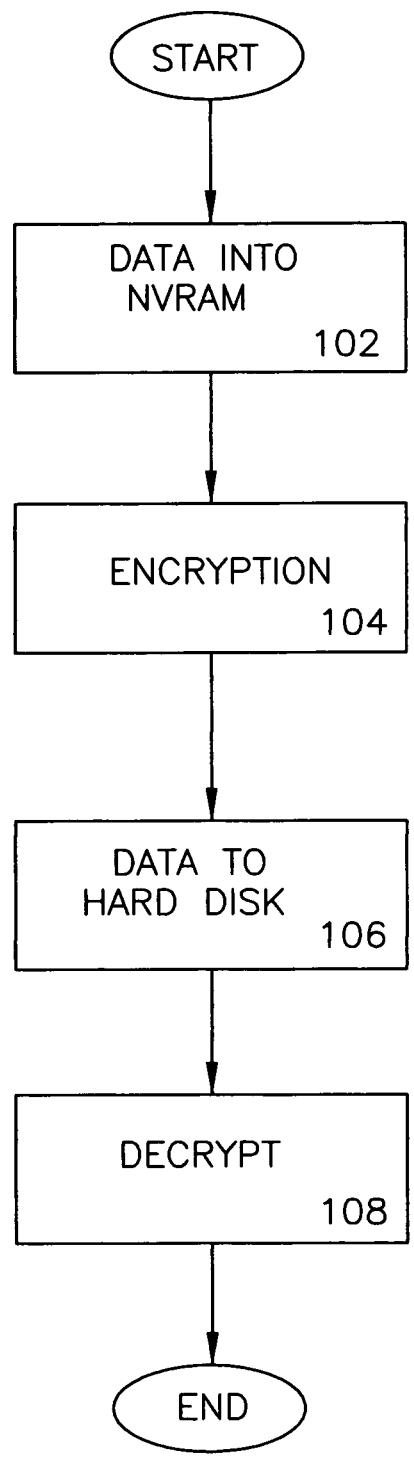
FIG. 2 schematically illustrates a first process for managing data encryption.
Figure 3:
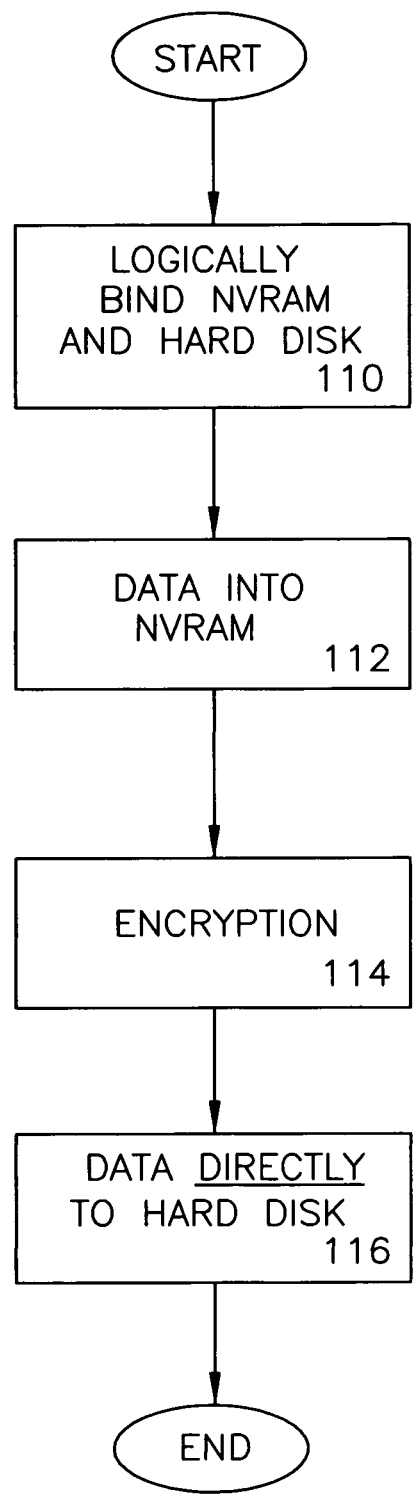
FIG. 3 schematically illustrates a second process for managing data encryption.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

One or more functional units described in this specification may be labeled as a "module", in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers or the ThinkCentre® workstation computers sold by Lenovo (US) Inc. of Morrisville, N.C., however, as will become apparent from the following description, the present invention is applicable to any data processing system.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and disk drive. In addition, I/O controller 70 supports external communication by computer system 12 via serial and parallel ports. Of course, it should be appreciated that the system 12 may be built with different chip sets and a different bus structure, as well as with any other suitable substitute components, while providing comparable or analogous functions to those discussed above.

Reference may now continue to be made to FIG. 1, in addition to FIGS. 2-3 which schematically illustrate processes in accordance with embodiments of the present invention.

In accordance with at least one preferred embodiment of the present invention, an encryption module 72 may preferably be provided which carries out additional functions as described herebelow with reference to FIGS. 1-3.

In a preferred embodiment of the present invention, data (upon authorization) is preferably decrypted via encryption module 72 as it comes out of NVRAM (e.g., as embodied by a flash drive at 56 in FIG. 1) on the way to the hard disk (e.g., as encompassed by system memory 46). This means the data will first have been encrypted as it went into the (flash drive) cache at 56 and decrypted when it comes out of the flash drive, regardless of where it is going. Thus, as shown in FIG. 2, data first goes into NVRAM/flash 102 whereupon it is encrypted (104) then, when data goes to hard disk (106) it then is preferably decrypted (108). It should be understood that any additional encryption of the data at this point may be carried out as desired; the process here essentially ensures, at a minimum, that data will not be vulnerable while in NVRAM/flash.

In a variant embodiment in accordance with the present invention, and with simultaneous reference to FIGS. 1 and 3, encryption module 72 may act to logically bind (110) the flash drive at 56 with the hard disk at 46, so that they would both use the same encryption key. Upon authorization, then, encryption module 72 would act, as data enters (112) the flash drive at 56, to encrypt the data (114). Thenceforth, data can be passed (116) directly to the hard disk at 46 without further encryption. On the other hand, when data out of the hard drive (at 46) goes to flash (at 56), it can clearly be passed without decryption by virtue of the common key employed between the hard drive and flash.

In this embodiment, should the hard disk at 46 be moved, or should there otherwise come to be a physical and/or communicative separation between the hard disk at 46 and flash drive at 56, the flash drive at 56 now will not match a "new" hard disk (i.e., the two will not be logically connected as described above). Thus, data now entering the flash drive at 56 will likely be decrypted (i.e., needing authorization). Preferably, then, the flash drive and hard disk key may be synchronized as soon as is viable, at which point the flash drive at 56 will take over encryption/decryption functions as described just above.

Finally, in another embodiment in accordance with the present invention, if the hard disk at 46 is moved to another system, then the flash drive at 56 may also preferably be simultaneously moved. This would preserve any data not yet written to the hard drive, and permits the encryption arrangement (of any type) to continue to work.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system comprising:
   a main memory;
   a full disk encryption hard drive;
   a non-volatile cache memory for said full disk encryption hard drive which stores data cached for said full disk encryption hard drive;
   an encryption module which encrypts data prior to storage in said non-volatile cache memory.

2. The system according to claim 1, wherein said encryption module acts to:
   encrypt data which enters the non-volatile cache memory; and
   decrypt data which leaves the non-volatile cache memory.

3. The system according to claim 1, wherein said encryption module comprises a common encryption key employed both by said hard drive and by said non-volatile cache memory.

4. The system according to claim 3, wherein said encryption module acts to encrypt data which enters the non-volatile cache memory.

5. The system according to claim 4, wherein said encryption module acts to pass already-encrypted data from said non-volatile cache memory to said hard drive.

6. The system according to claim 3, wherein:
   said common encryption key comprises a first encryption key; and
   said encryption module acts to establish a second common encryption key upon a change involving said first encryption key.

7. The system according to claim 3, wherein:
   said common encryption key comprises a first encryption key; and
   said encryption module acts to establish a second common encryption key upon a severance of communication between said non-volatile cache memory and said hard drive.

8. The system according to claim 3, wherein:
   said common encryption key comprises a first encryption key; and
   said encryption module acts to establish a second common encryption key upon removal of said hard drive and upon an establishment of communication between said non-volatile cache memory and a different hard drive.

9. The system according to claim 1, wherein said non-volatile cache memory comprises a flash drive.

10. A method comprising:
    providing full disk encryption of hard drive contents;
    storing in a non-volatile cache memory for a full disk encryption hard drive data which is cached for the full disk encryption hard drive; and
    encrypting data prior to storage in the non-volatile cache memory.

11. The method according to claim 10, wherein:
    said encrypting comprises encrypting data which enters the non-volatile cache memory; and
    said method further comprises decrypting data which leaves the non-volatile cache memory.

12. The method according to claim 10, wherein said encrypting comprises providing a common encryption key which is employed both by the hard drive and by the non-volatile cache memory.

13. The method according to claim 12, wherein said encrypting comprises encrypting data which enters the non-volatile cache memory.

14. The method according to claim 13, further comprising passing already-encrypted data from the non-volatile cache memory to the hard drive.

15. The method according to claim 12, wherein:
    the common encryption key comprises a first encryption key; and
    said encrypting further comprises establishing a second common encryption key upon a change involving the first encryption key.

16. The method according to claim 12, wherein:
    the common encryption key comprises a first encryption key; and
    said encrypting further comprises establishing a second common encryption key upon a severance of communication between the non-volatile cache memory and the hard drive.

17. The method according to claim 12, further comprising:
    removing the hard drive;
    establishing communication between the non-volatile cache memory and a different hard drive;
    the common encryption key comprising a first encryption key; and
    said encrypting further comprising establishing a second common encryption key which is employed both by the different hard drive and by the non-volatile cache memory.

18. The method according to claim 10, further comprising:
    moving the hard drive; and
    maintaining communication between the non-volatile cache memory and the hard drive during moving of the hard drive.

19. The method according to claim 10, wherein the non-volatile cache memory comprises a flash drive.

20. A program storage device readable by machine, tangibly embodying a program of instructions executable by the machine to perform steps comprising:
    providing full disk encryption of hard drive contents;
    storing in a non-volatile cache memory for a full disk encryption hard drive data which is cached for the full disk encryption hard drive; and
    encrypting data prior to storage in the non-volatile cache memory.

* * * * *